Figure 1:
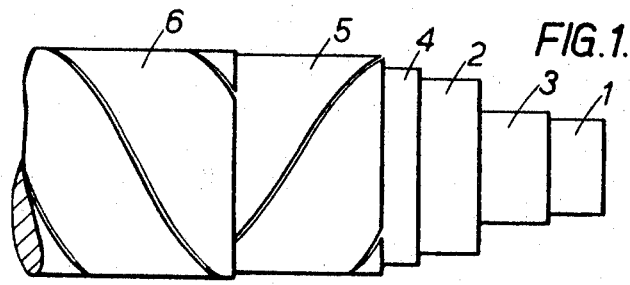

Oct. 8, 1968    F. T. WHITE ET AL    3,404,432
APPARATUS FOR MAKING ELECTRIC CABLES WITH EXTRUDED INSULATION
Filed July 15, 1963    2 Sheets-Sheet 1

United States Patent Office 3,404,432
Patented Oct. 8, 1968

3,404,432
APPARATUS FOR MAKING ELECTRIC CABLES WITH EXTRUDED INSULATION
Francis Thomas White and Oliver Sanders Johnson, Gravesend, and Edward Thompson Lloyd, New Eltham, England, assignors to Associated Electrical Industries Limited, London, England, a British company
Filed July 15, 1963, Ser. No. 294,882
Claims priority, application Great Britain, July 18, 1962, 27,607/62
1 Claim. (Cl. 18—13)

This invention relates to electric cables with extruded insulant constituting either the main conductor insulation or a sheath over the main insulation.

Certain cable insulants capable of application by extrusion are liable to deteriorate if exposed to electrical stresses such as may arise, especially in high voltage applications, when there exists either in the extruded material itself or between it and a conductive surface to which it is applied, discontinuities in which electrical discharges can take place. Extrusion techniques in cable manufacture have now advanced to the stage that the presence of voids in the bulk of the extruded material are no longer a problem. There is still considerable danger, however, of the extruded material not being in complete and intimate contact with a conductive surface with which such contact is intended, and even if such intimate contact is obtained in manufacture there is no guarantee that during installation or service the extruded material will not part from the conductive surface and thereby create a space in which electrical discharges can take place, with consequent degradation of the material leading to electric failure of the cable.

Because of these possibilities it is known to include in intimate contact with the inner and outer surfaces of the extruded insulant screening layers of conductive or semi-conductive material having the function of providing electrical short-circuiting of any voids between the extruded material as provided with these layers and an adjacent metallic surface with which it is intended to be in intimate contact. To this end it has previously been proposed, inter alia, to constitute the inner screening layer of extruded semi-conductive material (for example a semi-conductive polythene material when the extruded insulant is polythene), while the outer screening layer has commonly been constituted by a conductive coating such as of graphite applied in oil or water suspension. With the outer screening layer so constituted however, there is the possibility that the surface will not be completely covered or that the coating will be partially scraped off in some subsequent process, for instance in its passage through a mandrel of a taping machine by which conductive or semi-conductive tapes (for example of copper or semi-conducting fabric) are applied over the coated surface to reinforce the electrical conduction of the coating.

According to the present invention in the manufacture of electric cable with extruded insulant constituting either the main conductor insulation or an insulating sheath, semi-conductive layers of extrudable semi-conductive material capable of bonding with the insulant material are provided in contact with both the inner and the outer surfaces of said insulant by concurrent extrusion of the insulant and semi-conductive materials in a single extrusion head so that the extruded semi-conductor layers bond with the extruded insulant with complete and intimate contact at their interfaces. The concurrent extrusion in a common head also eliminates danger of entraining at the interfaces gaseous or solid inclusions which could give rise to regions of high electrical stress.

In carrying out the invention the same semi-conductive material may be used for both of the semi-conductive layers, and in this connection the invention also provides, for the extrusion of such material to form the two layers concurrently with extrusion of the insulant material, an extrusion head comprising an assembly of four interfitting tip and die units having first and second annular extrusion orifices defined respectively between the first and second units and between the third and fourth units for extrusion of the semi-conductive layers and a third annular extrusion orifice defined between the second and third units and positioned between the other two orifices for extrusion of the insulant between said layers, each orifice being constituted by a co-operating tip and die on the inner and outer respectively of the two units between which it is defined, and the assembly further including first and second inlet ports through the first, outermost, unit for respectively receiving the semi-conductive material and the insulant material from respective extrusion machines, shaped passages defined by facing surfaces of the first and second units and communicating between said first inlet port and the extrusion orifice defined between these units, first and second through-ports in the second unit in communication respectively with the first and second inlet ports, shaped passages defined by facing surfaces of the second and third units and communicating between said second through-port and the extrusion orifice defined between these latter units, a through-port in the third unit in communication with said first through-port, and shaped passages defined by facing surfaces of the third and fourth units and communicating between the extrusion orifice defined between these last units and the through-port in the third unit, said pasageways being shaped to distribute the extrusion materials into the annular orifices from the appertaining ports.

Figure 2:
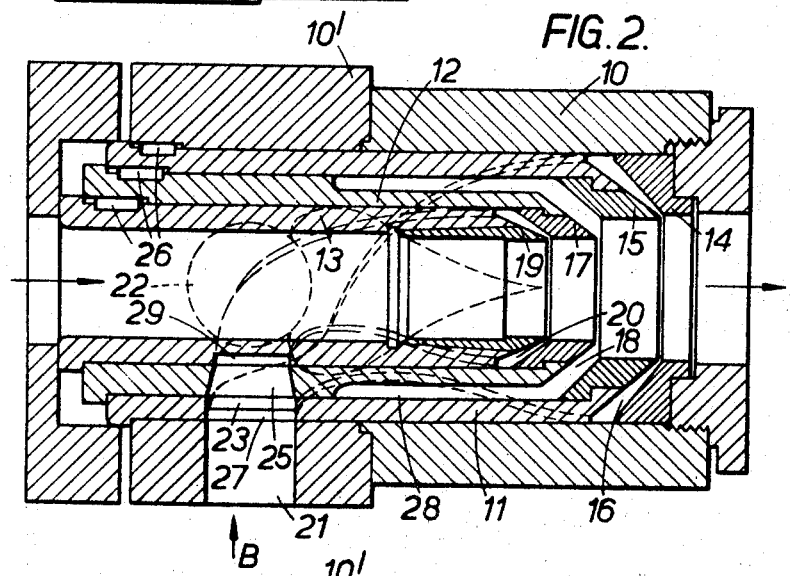
Figure 3:
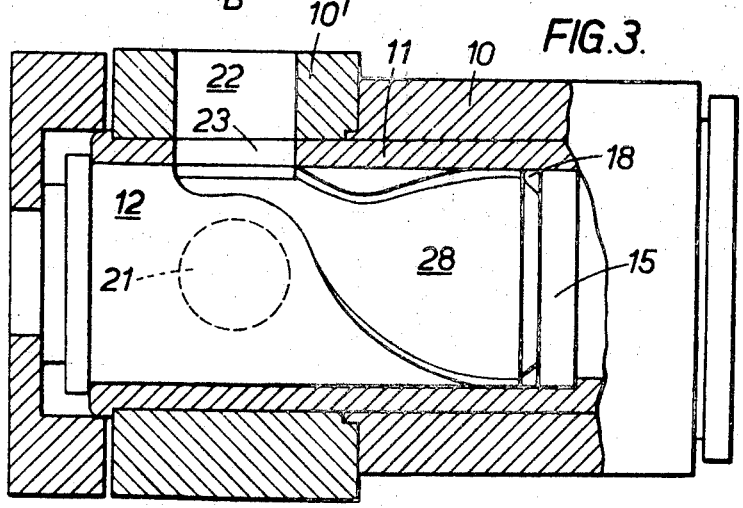
Figure 4A:
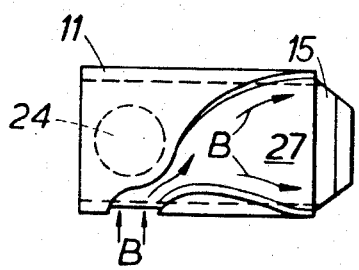
Figure 4B:
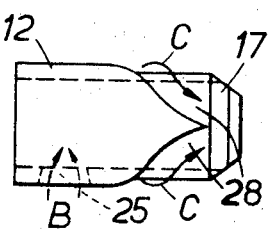
Figure 4C:
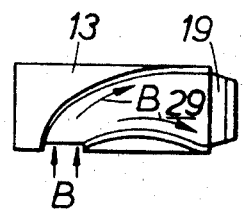
Figure 4D:
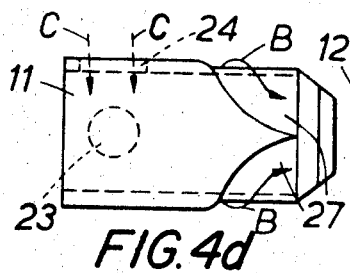
Figure 4E:
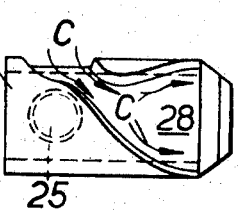
Figure 4F:
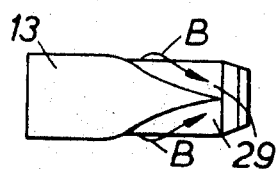
Figure 5A:
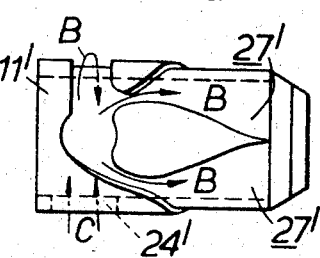
Figure 5B:
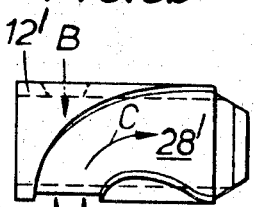
Figure 5C:
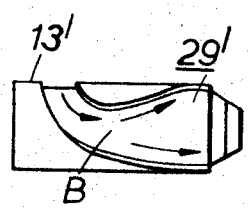
Figure 5D:
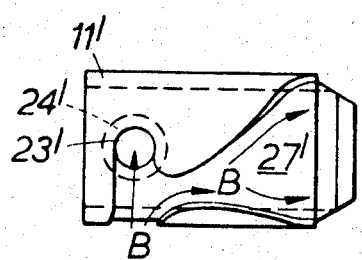
Figure 5E:
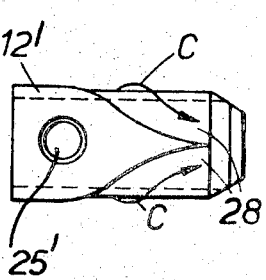
Figure 5F:
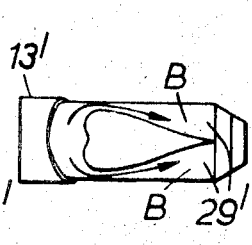

By way of example a form of cable which can be made in accordance with the present invention is illustrated diagrammatically in FIG. 1 of the accompanying drawings, while an extrusion head for concurrently extruding the bulk insulant of this cable with inner and outer semi-conductive layers is illustrated in FIGS. 2–5 of which FIG. 2 is a view of the extrusion head in axial cross-section, FIG. 3 is a part-sectional view of the extrusion head on a plane at right angles to the section plane of FIG. 2, FIGS. 4a–4c are external exploded views of the tip and die units of the extrusion head of FIG. 2, FIGS. 4d–4f are external views of the same tip and die units from a viewpoint displaced 90° from that of FIGS. 4a–4c, being top plan views of these figures as drawn and FIGS. 5a–5f show modified versions of the tip and die units, FIGS. 5a–5c being views corresponding to those of FIGS. 4d–4f and FIGS. 5d–5f being top plan views of FIGS. 5a–5c as drawn.

Referring to FIG. 1 the cable there illustrated comprises a cable conductor 1 insulated by extruded bulk insulant 2 sandwiched between inner and outer layers 3 and 4 of extruded semi-conductive material. A layer 5 of lapped semi-conductive tape surrounds the layer 4 and a layer 6 of lapped metal tape surrounds the layer 5. Conforming to the invention the semi-conductive layers 3 and 4 are extruded concurrently with the bulk insulant 2 in a single extrusion head so that the insulant 2 and the layers 3 and 4 are closely and integrally united.

As specific examples of materials the conductor 1 may be of stranded annealed copper with or without a layer of conductive or semi-conductive tape for example of metal or of carbon loaded textile between it and the semi-conductive layer 3. The bulk insulant 2 may in general be any suitable thermoplastic or thermosetting material capable of being extruded, and may or may not be a cross-linkable (vulcanisable) material. The semi-conductive layers may in general be any suitable extrudable material compatible with the insulant material and capable of bonding to it when extruded concurrently with it. It is contemplated that usually the semi-conductive material would be based on a material of the same general kind as that used for the insulant but suitably loaded to impart the required semi-conductivity. Examples of possible materials will be given later. The semi-conductive tape layer 5 (which may be omitted) may be of carbon-loaded textile or paper tape, and the layer 6 may be of copper or aluminium tape. The layer 6, with the layer 5 when present, has the function of reinforcing the conductivity of the outer semi-conductive layer 4 and thereby enhancing the screening of the cable.

Turning now to FIGS. 2-4 the extrusion head illustrated thereby comprises four inter-fitting tip and die units 10, 11, 12 and 13 of which the first, outermost, unit 10 has an extrusion die 14 which co-operates with a composite tip and die part 15 of the next unit 11 to define an annular extrusion orifice 16 for the extrusion of the outer semi-conductive layer 4 (FIG. 1). The third unit 12 also has a composite tip and die part 17 which co-operates both with the tip and die part 15 of the unit 11 to define an annular extrusion orifice 18 for the extrusion of bulk insulant 2 (FIG. 1) and also with a tip part 19 of the innermost unit 13 to define an annular extrusion orifice 20 for the extrusion of the inner semi-conductive layer 3 (FIG. 1). The cable conductor or conductors on to which the materials are to be extruded will be passed through the bore of the extrusion head in the direction of the arrows and will receive the inner semi-conductive layer, the bulk insulant and the outer semi-conductive layer in intermediate succession in a single pass, ensuring intimate bonding at, and exclusion of dirt or entrained air from, the interfaces between the two layers and the insulant between them.

Two inlet ports 21, 22 displaced 90° from each other and located upstream with respect to the positions of the extrusion orifices 16, 18 and 20, i.e. at locations relatively nearer the cable conductor entry end of the extrusion head, extend through a collar 10' which for the present purposes is to be considered as forming part of the unit 10 surrounding the unit 11. To these two ports 21 and 22 will be connected, in use, respective extrusion machines (not shown) of which one feeds the extrusion material for the bulk insulant to the port 22 while the other the extrusion material for the semi-conductive layers to the port 21. The unit 11 has through-ports 23 and 24 in alignment with the inlet ports 21 and 22 respectively, and the unit 12 has a through-port 25 in alignment with the port 23. To maintain proper alignment of the ports, the tip and die units are restrained against relative rotation by means of keys 26 in suitable keyways for instance.

As marked in dotted lines in FIG. 2 and shown more clearly in FIGS. 4a-4f the outer surfaces of the tip and die units 11, 12 and 13 are formed with shaped channels 27, 28 and 29 which define, in each case with the facing surface of the next unit tips, correspondingly shaped passageways by which the extrusion materials fed to the inlet ports 21 and 22 are fed to and distributed around the appropriate extrusion orifice. Thus the passageway constituted by channel 27 feeds the extrusion material from inlet port 21 to the orifice defined between units 10 and 11, channel 28 receives extrusion material from the inlet port 22 through port 24 and feeds it to the orifice defined between units 11 and 12, and channel 29 receives extrusion material from the inlet port 21 through ports 23 and 25 and feeds it to the orifice between units 12 and 13. The flow paths of the extrusion materials are marked in FIGS. 4a-4f, those relating to the material fed to inlet ports 21 being marked B and those relating to material fed to inlet port 22 being marked C.

With the foregoing description, it is thought that FIGS. 4a-4f are otherwise self-explanatory and that FIGS. 5a-5f showing modified versions 11', 12' and 13' of the tip and die units are also self-explanatory. In FIGS. 5a-5f elements corresponding to those in FIGS. 4a-4f have been given the same references but with priming dashes and it will be noted that in the modified version the through-port 23' in the unit 11' is 180° displaced from the port 24' instead of 90° as in the other version. Consequently the through-port 25' in unit 12' is displaced by 90° from its original position in order to be in alignment with port 23' as before. In this modified version the port 23' is no longer in alignment with the inlet port 21 but is displaced 90° from it and is in communication with it via a branch of the passageway 27' defined between the facing surfaces of units 10 and 11'.

It will be noticed that in all cases the passages 27, 28 and 29 or 27', 28', 29' are so shaped as to include a part of constricted cross-section which will act as a nozzle.

In addition to the advantage of dirt and air exclusion afforded by the concurrent extrusion method of the present invention, there is further advantage to be gained in using the method for cables with non-circular conductors. In multi-core cables, particularly three-core cables, there is economic advantage in using sector shaped conductors so that when the insulated conductors are laid-up together they occupy a smaller overall cross-sectional area. This is established practice with paper insulated cables and with plastic insulated cables for lower voltages, but hitherto high voltage polythene insulated cables have generally been manufactured with circular conductors. In extruding polythene or such like insulation on to a previously and separately applied semi-conductive screening layer it is essential to apply some radial forces in the extrusion process in order to ensure intimate contact between the extruded insulation and the underlying screening. This can be achieved without undue difficulty with circular conductors. In the case of a non-circularly shaped conductor extruded insulation is generally applied by extruding a tube of the insulation about the screening layer on the conductor, the inner diameter of the tube being somewhat greater than the maximum dimension of the conductor plus the screening layer, and then causing the tube to be drawn into contact with the screening layer by applying a degree of vacuum to the back of the extrusion head. It remains difficult however to achieve the necessary uniformity and intimacy of contact between the extruded insulation and the screening layer especially if the axis of the conductor is rotating as it passes through the extrusion head as is required when a "pre-spiralled" conductor is being insulated. With the concurrent extrusion method of the invention the two screening layers and the intermediate insulant issue from the extrusion head as a composite tube in which they are intimately bonded together in a composite sandwich and this tube as extruded on to a non-circularly shaped conductor can then be drawn down to take the shape of the conductor and there is no problem of ensuring intimate contact as this is already present between the inner semi-conductive layer and the insulant in the extruded tube.

In carrying out the invention the insulant material used may be a polyolefine such as low or high density polythene or polypropylene and the semi-conductive material may correspondingly be a semi-conductive polyolefine composition by which is meant a composition based on polythene or other polyolefine content, with or without a modifying material such as butyl rubber or other synthetic rubber which may be incorporated for ease of subsequent processing or for imparting desired physical characteristics, the whole being suitably loaded with carbon, graphite or other finely divided conducting material so that the composition shall have the appropriate electrical characteristics. Other examples of basic materials that may be used for the bulk insulant and semi-conductive layers are butyl rubber, polyvinylchloride and ethylene propylene rubber. If a cross linkable material is used for the insulant the material used for the semi-conductive layers may or may not also be a cross linkage material.

What we claim is:

1. An extrusion head assembly for the manufacture of electric cable comprising a conductor insulated by a layer of insulating material sandwiched between inner and outer layers of semi-conductive material, said assembly comprising four interfitting tip and die units having first and second annular extrusion orifices defined respectively between the first and second units and between the third and fourth units for extrusion of the semi-conductive layers and a third annular extrusion orifice defined between the second and third units and positioned between the other two orifices for extrusion of the insulant between said layers, each orifice being formed between a cooperating tip and die belonging respectively to the inner and outer of the two tip and die units between which it is defined, and the assembly further including first and second inlet ports through the first, outermost, unit for respectively receiving semi-conductive extrusion material and the insulating extrusion material, said inlet ports being located upstream of the position of the extrusion orifices, shaped passages defined by facing surfaces of the first and second units and communicating between said first inlet port and the extrusion orifice defined between these units, first and second through-ports in the second unit in communication respectively with the first and second inlet ports, shaped passages defined by facing surfaces of the second and third units and communicating between said second through-port and the extrusion orifice defined between these latter units, a throughport in the third unit in communication with said first through-port, and shaped passages defined by facing surfaces of the third and fourth units and communicating between the extrusion orifice defined between these last units and the through-port in the third unit, said passageways being shaped to distribute the extrusion materials into the annular orifices from the appertaining ports.

References Cited

UNITED STATES PATENTS

| | | | |
|---|---|---|---|
| 3,322,870 | 5/1967 | Sacks | 264—209 |
| 2,932,323 | 4/1960 | Aries | 264—209 |
| 3,103,036 | 9/1963 | Nave et al. | 264—98 |
| 3,222,721 | 12/1965 | Reynolds | 18—13 |
| 2,304,210 | 12/1942 | Scott et al. | |
| 2,969,419 | 9/1954 | Gray | 174—69 |
| 3,100,136 | 6/1959 | D'Ascoli. | |

FOREIGN PATENTS 763,761   12/1956   Great Britain.

ROBERT F. WHITE, *Primary Examiner.*

G. AUVILLE, *Assistant Examiner.*